Figure 1:
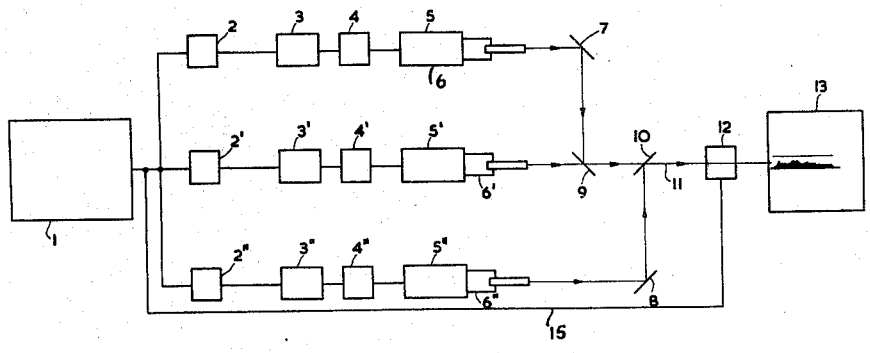

July 12, 1960

W. J. D. VAN DIJCK 2,944,620

METHOD OF RECORDING SEISMOGRAMS AND OF
PREPARING DERIVED SEISMOGRAMS

Filed May 3, 1955

INVENTOR
WILLEM JOHANNES DOMINICUS VAN DIJCK

BY *A. W. Alexander*

ATTORNEYS

United States Patent Office 2,944,620
Patented July 12, 1960

2,944,620

METHOD OF RECORDING SEISMOGRAMS AND OF PREPARING DERIVED SEISMOGRAMS

Willem Johannes Dominicus Van Dijck, The Hague, Netherlands, assignor to Shell Oil Company, a corporation of Delaware Filed May 3, 1955, Ser. No. 505,752

Claims priority, application Great Britain May 4, 1954

5 Claims. (Cl. 181—.5)

The invention relates to a method of seismic prospecting of the earth, more particularly to a method of recording diagrams obtained in this way of prospecting. As is known, in seismic prospecting vibrations are artificially generated in the earth and are received by one or more detectors. Usually the detector (seismograph, geophone) converts the vibrations received into electric currents or voltages, and their amplitude, as a function of time, is then recorded as a seismogram by means of a recording device.

Generally it is desired (and is also known) to carry out the recording in such a way that the seismogram contains all data, that is, a record obtained without suppressing certain frequencies or frequency bands in the signal originally received and without mixing the signals received by a number of detectors. Subsequently, a more legible diagram can be derived, in a central laboratory, from the seismogram originally recorded, by means such as the introduction of filters, mixing or the distortion of scales.

It is known to subject the seismogram to frequency analysis, i.e., to examine what frequencies (or groups of frequencies) occur in the diagram as a function of time. This is important, since the presence or absence of certain frequencies are often an indication of the presence or absence of particular strata at certain depths.

The present invention is based on the idea that it is a desirable object to render immediately visible in the seismogram the characteristics which are particularly determined by the degree to which certain frequencies or frequency groups occur in the seismic signal. This would considerably facilitate the visual interpretation and correlation of the seismograms.

According to the present invention this object is achieved by introducing in the diagram—in addition to the usual marking of the amplitude of the seismic signal—differences in colour, which are an indication of the degree to which one or more frequencies or frequency groups occur in the signal or of the relative intensity (intensities) of certain frequencies or frequency groups in the signal.

The diagram can be recorded in colour as soon as the original recording is made, but it is preferable to introduce the colour indication subsequently in a seismogram derived from the original recording; in the latter case frequency analysis is applied to the original recording and the result used to indicate the colour in the derived seismogram.

In principle, it is possible to provide in the diagram, beside each signal recorded, a separate band, the colour of which shows the indication in question. Preferably, however, each signal band itself is shown in colours.

In doing so, the marking of the signal amplitude may be carried out in the colour (colours) which serve for the said indication. It is possible, and it often deserves preference, not to combine the marking of the amplitude with the colour indication and to register the amplitude independently, for example in black or white. The recording of the amplitude can be carried out in different ways well known in the art, such as a curve, in a so-called "variable-area" diagram or in a "variable-intensity" diagram.

So far, diagrams have only been recorded in black and white; in a "variable-area" diagram the breadth of the black part (ordinate), for example, may be a measure of the amplitude of the signal received as a function of time (abscissa). According to an embodiment of the present invention the part which was formerly white is now shown in colours, these being determined by the character of the signal.

It is also possible, however, to reproduce the "variable-area" diagram in such a way that the part which was formerly opaque is now shown in colour.

If the amplitude is recorded as a curve (preferably in black or white) the colour indication can be registered as a background. Generally the amplitude is registered by means of a white light-beam of small diameter, the deviation of which is controlled by a mirror-galvanometer. In the seismogram thus recorded the amplitude is outlined as a black curve against a coloured background (coloured in complementary colours). A positive print of this seismogram will show the amplitude as a white curve against a coloured gackground.

The curve may also be registered by means of the light-beam serving for the colour indication.

A "variable-intensity" diagram can be recorded in colour as well. In this case the registering of the amplitude is carried out by means of intensity variations in the light-beam, the colour of which is determined by the character of the signal. The coloured light-beam originally has to show a constant intensity independent of the colour, so that the intensity variations to be introduced in the beam are, in fact, a measure of the signal amplitude.

The several embodiments of the invention may be produced with relative ease by the suitable use of a colour-sensitive medium, preferably a colour film.

Figure 2:
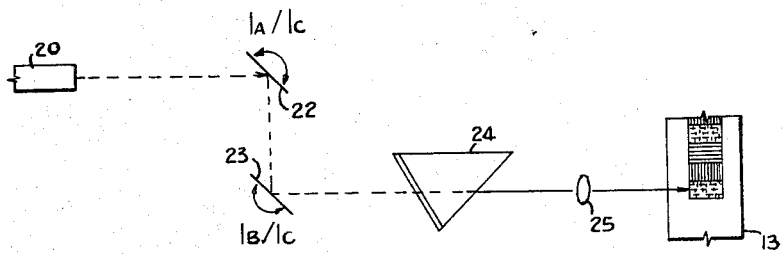

The above objects and advantages of this invention will be more easily understood by those skilled in the art from the following description when taken in conjunction with the attached drawing in which:

Figure 1 is a schematic drawing showing the use of three separate circuits for obtaining the three primary colors for recording a color seismogram; and Figure 2 is a schematic drawing of a single circuit which utilizes a triangular color filter to obtain the different colors for recording a color seismogram.

In a preferred embodiment of the present invention, use is made of the fact that for a normal eye the colour space is two-dimensional, at least if the intensity of the colour is left out of account. Consequently a colour (disregarding its intensity, which for the moment is left out of account here) is determined by two parameters.

The frequency spectrum of the elastic vibrations received (which covers a range of approximately 20–300 cycles per second) may be imagined as divided into three frequency bands A, B and C (for instance, say, 20–40, 40–80 and 80–300; in principle, however, the frequency bands selected need not cover the entire frequency spectrum; thus, for example, the bands 10–40, 40–70 and 70–100 may be selected) and the intensity in each frequency band may be determined by means of a continuous development in damped oscillating functions. The ratios between these intensities ($I_A$, $I_B$ and $I_C$), e.g., the ratios $I_A/I_C$ and $I_B/I_C$ may now be used as the parameters which determine the colour of the diagram at each abscissa.

The following procedure may be adopted. A colour-film is used in a recording device which is capable of registering "variable-area" diagrams, and the film is exposed to light of a colour which is determined by the intensity ratios referred to. From the colour variation in the diagram it can thus be seen at each particular place in the diagram (actually during a short period before and after the time corresponding to the place in question in the diagram) how the frequencies in the signal received are distributed. The breadth of the light-beam remains a measure of the amplitude of the signal at the corresponding time in the same manner as previously was the case with black-and-white recording.

The light used for recording the colour diagram may be obtained, for example, by mixing light derived from three sources of coloured light, each of which represents one of the primary colours (red, yellow, blue). They may be pure spectral colours although this is not essential. The intensity of the contribution of the various sources of light to the total amount of light projected on the film can be controlled by the different intensities $I_A$, $I_B$ and $I_C$. The total intensity of the light can be kept constant or approximately so, which means that the ratio between the amounts of light is determined by the ratios $I_A/I_C$ and $I_B/I_C$.

The light-beams from the three sources need not, however, be mixed; the colour film may be exposed to the three beams one after the other, or simultaneously at different places.

An alternative method of directly determining the colour of the light by means of the ratios $I_A/I_C$ and $I_B/I_C$ is to transmit white light via two small mirrors through an optical filter with the shape and colours of the colour triangle. The mirrors are controlled by the above-mentioned intensity ratios. As a result, the original beam of white light which constantly passes through different points of the colour triangle, as directed by the mirrors, continually changes in colour on passing the colour-triangle filter, dependent on the values of the intensity ratios.

Light obtained in this way, which constantly changes in colour, can now be used for the colour indication of the seismogram.

The colour-triangle filter can be constructed in such a way that the light-beam which has passed through this filter always has a constant intensity. Such a light-beam can advantageously be used in recording a "variable-intensity" diagram.

In a more simplified embodiment of the present invention it is sufficient to change the colour of the diagram one-dimensionally only instead of two-dimensionally. Consequently it is possible to show in the drawing the magnitude of one intensity ratio only. Instead of three frequency bands, two frequency bands (D, F) are chosen, for instance. In this case the colour is determined by the ratio $I_D/I_F$. One frequency band (D) may be narrow, for example, and the other wide (it may, for example, consist of the remainder of the frequency spectrum). The separate bands D and F may also be comparatively small, and need not constitute together the total frequency spectrum of the elastic vibrations.

The intensity ratio $I_D/I_F$ may now control the ratio of the quantities of, for example, two more or less sharply contrasting colours (such as yellow and blue, red and green, green and purple, or white and a spectral colour).

Each of the intensities $I_D$ and $I_F$ may, however, control separately the intensity of a light-beam; these light-beams, if desired after mixing, are used for the colour indications.

If a given frequency band is very narrow, the intensity of this band is practically an indication of the presence of a given frequency; in this case the occurrence of the corresponding colour in the diagram points to the occurrence of that frequency at that place in the signal received.

It is, however, to be remarked that the narrower the frequency band is chosen, the less sharply the said place can be indicated in the seismogram.

In a still more simplified embodiment of the invention—which is, however, a less recommendable one—the signal is analyzed with respect to a single frequency band H only, say, e.g., the frequency band 70–100. The intensity $I_H$ now determines the intensity of a single colour, for example red, in the seismogram. The occurrence of frequencies in the band H at certain spots of the seismogram will be shown there by the appearance of the red colour in the diagram. In this case the intensity of the color will vary in accordance with $I_H$.

If the light to be registered is red, the colour in the registered diagram (positive copy) may range from a very dark red (next to black) to a bright red if the diagram is viewed in incident light (e.g., registration on paper); it may range from a very unsaturated red (pink-rose) to a very saturated red (deep red) if the diagram is viewed in transmitted light (e.g., registration on colour film). Instead of recording in red and shades of red one could in principle also register in grayish shades (black-gray-white). Such a recording has, however, the disadvantage that the correlation of different seismograms is less easy.

The intensities at which given frequencies or frequency groups occur in the signal received are determined by analysis.

Any known method can be used for this analysis; the analysis may, for example, be carried out by calculation, but it is advisable to analyze the signal automatically.

The process according to the invention is preferably used when the seismic signal has already been recorded in any way (optically, magnetically, mechanically, etc.). In order to carry out the analysis the seismogram which has been once recorded must be played back. This can be done at the same speed with which it was first recorded, but it is often advantageous to use a higher speed.

The analysis is now carried out over a relatively small part of the seismogram, and the part on which the analysis is carried out is gradually moved.

From the analysis then follow the intensites $I_A$, $I_B$, $I_C$ (or $I_D$, $I_F$ or $I_H$) or their ratio (ratios) as a function of the place at which the diagram was analyzed. The colour of the light belonging to the said intensities (or intensity, ratios or ratio) corresponds to the analyzed part of the diagram.

The analysis can be carried out symmetrically or asymmetrically (calculated in respect to the time) as will be further explained below. In symmetrical analysis the colour also corresponds to the centre of the analyzed part; in non-symmetrical analysis there is a small shift in time.

The width of the part to be analyzed is directly correlated to the width of the selected frequency band(s). The width chosen should not be too small as otherwise it is no longer possible to indicate with sufficient accuracy where the frequencies of the specific frequency band occur in the diagram; on the other hand the part should not be too great as it will then be impossible to discriminate between different frequencies in the signal, particularly in the region of the lower frequencies, as compared to higher frequencies.

The analysis may be carried out in a practical manner by means of electric filters. The signal once recorded is played back optico-electrically, for example (where the signal is optically recorded on a film) or magneto-electrically (where a magnetophone is used to record the signal), and the electric signal thus obtained is passed through suitable electric filters.

From the output voltage of the filters a non-oscillating magnitude may be derived which is a measure at any moment of the intensity at which the particular frequencies or frequency groups occur in the signal. Each filter thus gives eventually one such magnitude.

To this end the output voltage of a filter may, for example, be rectified in full-wave rectification and smoothed out (i.e., the remaining periodicity in the doubly rectified voltage—practically corresponding to twice the central frequency of the filter—is removed).

The control magnitudes, or their ratios, which are thus obtained, determine the colour recorded in the diagram.

If the analysis is carried out optically by the use of optical filters, an analysis which is symmetrical with respect to the time may be effected in a very simple way. A part of the diagram is imaged on an optical filter. In this case the above-mentioned time shift does not occur.

When, however, the analysis is carried out normally with electric filters, an asymmetric filtering is obtained with respect to the time (in popular terms: the future and past of the seismic signal, with respect to a certain moment, are differently evaluated). A small shift now occurs between the place in the diagram which passes the play-back apparatus at a given moment, and the values which the said control magnitudes assume at that moment. A correction may be made for this shift by projecting, for example, the coloured light-beam and the light-beam for the amplitude marking on the colour-sensitive film at places which are somewhat shifted with respect to each other.

As is moreover known, an even better result can be obtained by the use of a double analysis; for this purpose the seismogram is played back once normally; the analysis obtained is recorded and the latter is afterwards played back in reverse in respect to the time, while the result is passed through the same or a similar analyzer. In this way an analysis is obtained which is symmetrical with respect to the time, so that no shift occurs.

It has already been observed that the band width of the filter should neither be too large nor too narrow. The finite band width of a filter causes a suddenly occurring vibration, with a certain frequency situated within the frequency band of the filter, to be spread out over a certain distance in the diagram which could be recorded from the output of the filter. The sudden occurrence of the said frequency is thus reproduced spread in time. In the diagram there thus creeps in an uncertainty with regard to the place where this sudden occurrence took place in the original seismogram (and thus also with respect to the time of the sudden occurrence in the original seismic signal). Such a sudden occurrence will generally be correlated to and caused by a given formation layer in the earth. The said uncertainty in place (or time) therefore means a corresponding uncertainty in the depth of the layer from which the corresponding part of the total signal is derived.

In this connection it is often advisable to allow the same degree of uncertainty in the analysis results of the various filters. In this case the same band width is chosen for the various filters. Since, however, seismic waves with a higher frequency have a greater solubility for structural differences in the earth than waves with a lower frequency (cf. the corresponding solubility of an optical system for details of objects which are viewed with this system) one may also consider choosing a smaller uncertainty where a higher solubility for structural differences is possible, i.e., in the case of the higher frequencies. The uncertainty can, for example, be made inversely proportional to the frequency. The band width of the filters then increases with the frequency. For instance, 20–40, 40–80 and 80–160; or 20–30, 30–45 and 45–67 could be taken as band width for the three filters.

In many types of filters, e.g., electrical filters consisting of a single circuit, or optical filters, which show a transmitting area corresponding to a probability curve, the band width also determines the time constant of the filter (i.e., the time which the filter requires to let die out a vibration). If this is not the case, as, for instance, in the case of band filters with a very sharp cut-off, the time constant must also satisfy certain conditions. In order to obtain a constant uncertainty which is independent of the frequency, the time constants of the different filters must be equal to each other. If the uncertainty decrease is directly proportionate to the increase of frequency, the time constants of the filters should decrease in proportion to their central frequency.

If the control magnitude is derived from the analysis result by double phase rectification and smoothing out, the smoothing device comprises a smoothing filter in order to separate the modulation from the double central frequency of the analysis filter. The time constant of this filter should be chosen conveniently as large as the time constant of the corresponding analysis filter.

In what is stated above it is assumed that the signal was already received and recorded, and that a colour diagram was derived from the original diagram. This is the most accurate method of producing a colour diagram. Nevertheless—as already mentioned—it is also possible in principle to construct a colour diagram at the very first recording. In this case the signal received should be analyzed immediately (e.g., via filters as described above) and the result of the analysis (e.g., the voltages derived from the filters) then determines the colour of the diagram. In this case, however, the analysis is asymmetric and less accurate than when the entire course of the signal as a function of time is already available.

If the signal is first recorded and the colour diagram is derived from it afterwards, it is of advantage to use a method of mechanical recording, by which a bit or stylus—controlled by the signal—traces a transparent track of variable breadth through a film, which is opaque or nearly so and moves with uniform velocity relatively to the bit or stylus. The film can be mounted on a flexible base, such as a celluloid tape, or on a hard base, such as a glass plate. The speed at which the film passes the bit is usually not more than 10 centimeters/second, and preferably about 2–5 centimetres/second. The bit is preferably made in the form of a wedge; it can also have the shape of a half-wedge, especially when a large number of tracks have to be recorded side by side on the film. In this way a "variable area" diagram is immediately available which can be quickly recorded in a simple way and which for the purpose of frequency analysis can be played back optico-electrically without complications; the diagram has the further advantage that its quality can be judged immediately after the recording, e.g., under a weakly magnifying microscope.

The invention will be further illustrated with reference to the accompanying Figure 1 showing a block-diagram of an apparatus for carrying out the present process. It is assumed that the original seismic signal is recorded magnetically. Thus on a magnetic tape a number of seismograms are recorded side by side, representing the signals received by a number (e.g., 12 or 24) of geophones.

In the apparatus shown in the drawing each of the seismograms is converted each time into a colour diagram. The various colour diagrams are recorded again next to each other so that they may be visually intercorrelated.

The magnetically recorded seismogram is now first played back by a play-back apparatus (1) preferably at a greater speed than at which it is recorded, so that an electric signal is obtained which contains entirely, or practically entirely, the same information as the signal originally recorded. This signal is led to three electric filters (2, 2′ and 2″). These filters are band filters which have frequency bands corresponding to the original frequencies 10–40, 40–70 and 70–100 Hertz. The time-constants of these filters are equal.

From the signal thus filtered, which shows, of course, an oscillating character, a non-oscillating voltage is derived by which the intensity of a source of light can be controlled. This may be effected, for example, by full-wave rectifying and smoothing out the filtered signal; the rectifiers required for the purpose are shown in the drawing by 3, 3' and 3'', respectively, and the smoothing devices by 4, 4' and 4'', respectively. The time-constants of the smoothing filters correspond with the time-constants of the filters 2, 2' and 2''.

The voltage obtained, which is a direct voltage of variable amplitude, is afterwards amplified in a direct current amplifier (5, 5' and 5'' respectively). The amplified voltage is led to a gas-discharge tube ("crater-tube") of which the light intensity corresponds to the impressed voltage. Each of the three voltages controls the intensity of light of one of the three tubes 6, 6' and 6''. Tube 6 may, for example, be a neon-tube, which mainly emits red light (if desired an optical filter which passes red may be placed in the radiated light beam), the two other tubes 6' and 6'' may be mercury tubes, in which case, for example, a green filter is placed behind tube 6' and a blue filter behind tube 6''.

The intensities of the three beams of light now change according to the intensities $I_A$, $I_B$ and $I_C$. By means of a set of mirrors 7, 8, and a set of semi-transparent mirrors 9, 10, the three separate beams of light are mixed to a resultant light beam 11, the colour of which depends on the three intensities $I_A$, $I_B$ and $I_C$. This colour is therefore a measure of the frequency character of the original signal.

The beam of light 11 is now led to a device 12 which is known per se by means of which a so-called variable area diagram can be recorded.

The device 12 may consist of a mirror galvanometer which is controlled by signals derived from the play back apparatus 1 which is connected to the device 12 by means of a lead 15. The mirror galvanometer 12 may be of any well known design in which the mirror is rotatable and is positioned by means of a signal derived from the play back apparatus 1. Mirror galvanometers of this type are well known in the field of seismic exploration, especially that portion of the field dealing with the re-recording of seismograms. Behind this device is a cylinder 13 on which a colour-sensitive film is wound, which cylinder may be suitably coupled to the roll on which is mounted the magnetic tape in the playback apparatus 1.

In this way a variable area diagram is recorded on the colour-sensitive film in the colours which the beam of light 11 shows in the course of the procedure.

The process described is repeated for each seismogram recorded, the cylinder being moved each time over the width occupied by a seismogram.

If filters were chosen with different time constants (e.g., filters having band widths directly proportional to the central frequencies of the filters) the time shift mentioned above would have been different for the various colours. In this case it is better not to mix the light-beams, but to project each separately on the appropriate spot on the film. The marking of the amplitude by the device 12 may now be carried out with white light, After development of the film thus exposed a "variable-area" diagram in black results, with an adjoining coloured part in which the colours are complementary to those of the light to which the film has been exposed.

In the embodiment of the invention shown in the drawing the original seismogram was scanned at one spot only and the signal thus obtained was led to each of the filters. It is, however, possible and often desirable to scan the seismogram at a plurality of spots, for example four spots. Three of the four signals will be directed to filters 2, 2' and 2'' respectively and the fourth to device 12. The colour film has now to be exposed to light-beams at four differently located spots, which correspond to the locations of the scanning spots. In the case of two filters, scanning will have to be applied at three spots at most. Sometimes it is possible to direct one of the signals, scanned for the purpose of the colour indication, to the device for the marking of the amplitude, in which case scanning need be carried out at three spots (or two spots respectively) only.

The amplitude of the signal could also have been recorded as a curve (instead of the "variable-area"-recording); the colour indication would then have appeared as a coloured background to the said curve.

Figure 2 illustrates a means for providing a variable color, variable intensity seismogram while using a single source of constant intensity light in combination with a color triangular filter. A source of light 20 is disposed so as to project light onto a first mirror 22. The source of light 20 can be any well known source of white light, such as an incandescent light having a substantially constant intensity. The beam of light strikes a first mirror 22 whose angular position is controlled by the ratio of intensities $I_A$ and $I_C$. The beam of light is reflected from the mirror 22 to a second mirror 23 whose angular position is controlled by the ratio of intensities $I_B$ to $I_C$. The mirror 23 reflects the beam of light through a color triangular filter 24 which in turn projects the light through a suitable focusing lens 25. The focusing lens 25 in turn focuses the beam of light on the color filter strip 13 to generate a variable intensity diagram in which the intensities of the separate colors vary, respectively, in proportion to the amplitude of the signals in each band assigned to the particular colors. The color triangular filter 24 is a well known device in which the colors transmitted from the filter depend upon the portion of the inlet side of the filter on which the light beam falls. The light beam is caused to move over the inlet side of the filter by rotating the two mirrors 22 and 23. Thus the output of the color filter is directly proportional to the ratio of intensities of the inlet signals corresponding to the amplitude of the various frequency bands.

I claim as my invention:

1. In a method of seismic exploration, the steps of generating seismic waves having a wide spectrum of frequencies, converting said seismic waves into electrical oscillations having a corresponding spectrum of frequencies, assigning to at least one band within said spectrum a particular color of the color spectrum, recording said electrical oscillations in the form of a variable area color seismogram, controlling the instantaneous amplitudes of the variable areas on said seismogram as a function of the instantaneous amplitudes of said electrical oscillations, and controlling the intensity of said particular color in said seismogram as a function of the predominance of the oscillations of the corresponding frequency band in said seismic waves.

2. In a method of seismic exploration, the steps of generating seismic waves having a wide spectrum of frequencies, converting said seismic waves into electrical oscillations having a corresponding spectrum of frequencies, assigning to at least one band within said spectrum a particular color of the color spectrum, recording said electrical oscillations in the form of a color seismogram, controlling the intensity of said particular color in said seismogram as a function of the predominance of the oscillations of the corresponding frequency band in said seismic waves, and superimposing on said color seismogram an oscillating curve recorded as a function of the instantaneous amplitudes of said electrical oscillations.

3. In a method of seismic exploration, the steps of generating seismic waves having a wide spectrum of frequencies, converting said seismic waves into electrical oscillations having a corresponding spectrum of frequencies, filtering said oscillations to a band of a predetermined width, assigning to said band a particular color within the color spectrum, recording said electrical oscillations in the form of a color seismogram, the ordinate of said seismogram being proportional to the amplitude of said oscillations, deriving from said filtered oscillations a control signal which is a measure of the presence in said frequency spectrum of frequencies coming within said band, and controlling the intensity of said particular color in said seismogram by means of said signal.

4. In a method of seismic exploration, the steps of generating seismic waves having a wide spectrum of frequencies, converting said seismic waves into electrical oscillations having a corresponding spectrum of frequencies, filtering said oscillations to obtain a plurality of frequency bands of predetermined width, assigning to each of said bands a particular color within the color spectrum, recording said electrical oscillations in the form of a color seismogram, the ordinate of said seismogram being proportional to the amplitude of said oscillations, deriving from said filtered oscillations a plurality of control signals, each of said control signals being a measure of the presence in said frequency spectrum of a particular frequency coming within one of said bands, and controlling the intensity of each particular color in said seismogram as a function of the particular control signal associated therewith.

5. The method of claim 4, comprising the steps of deriving a plurality of ratios between selected pairs of said control signals, and controlling the intensity of each particular color in said seismogram as a function of the particular signal ratio associated therewith.

References Cited in the file of this patent

UNITED STATES PATENTS

| | | | |
|---|---|---|---|
| 1,690,279 | Craft | Nov. 6, | 1928 |
| 2,051,153 | Reiber | Aug. 18, | 1936 |
| 2,615,778 | Butz | Oct. 28, | 1952 |
| 2,620,890 | Lee | Dec. 9, | 1952 |
| 2,629,778 | Potter | Feb. 24, | 1953 |
| 2,794,965 | Yost | June 4, | 1957 |
| 2,821,892 | Merten | Feb. 4, | 1958 |